July 21, 1936.  D. E. FELTMAN  2,048,441
PLANTER
Original Filed May 14, 1935  2 Sheets-Sheet 2
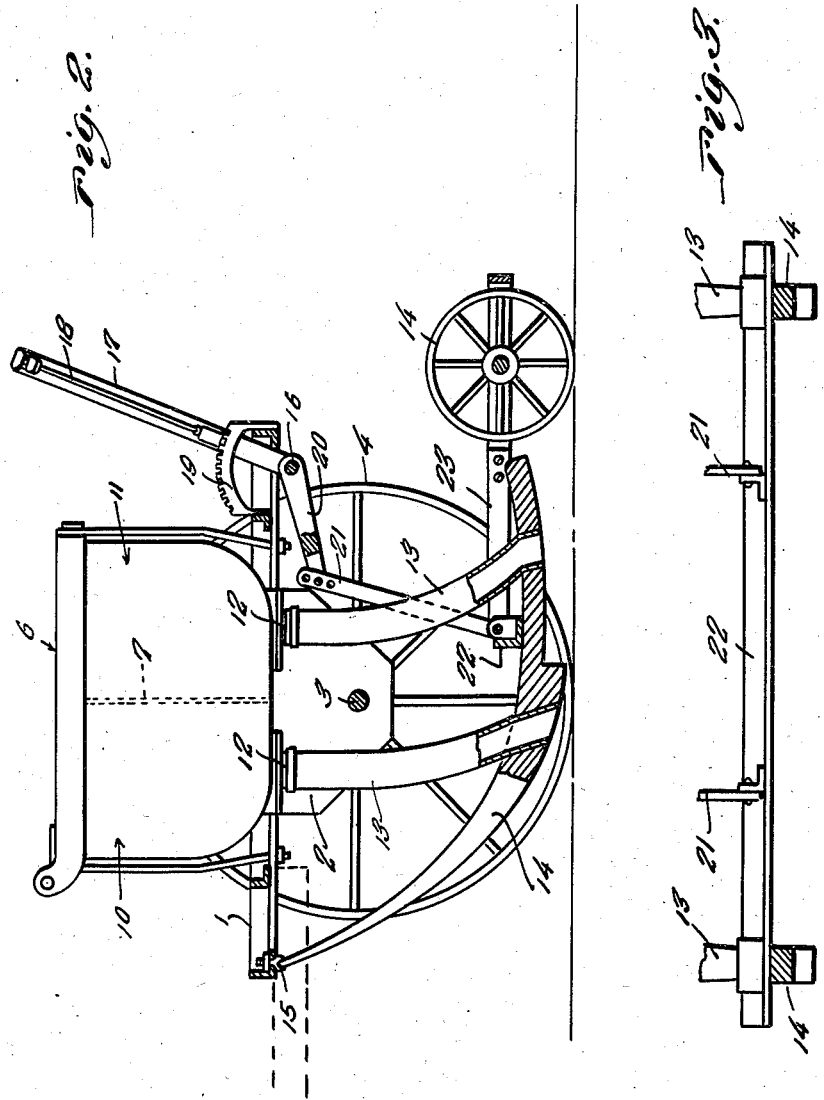
Inventor
D. E. Feltman
By Clarence A. O'Brien
Attorney Patented July 21, 1936

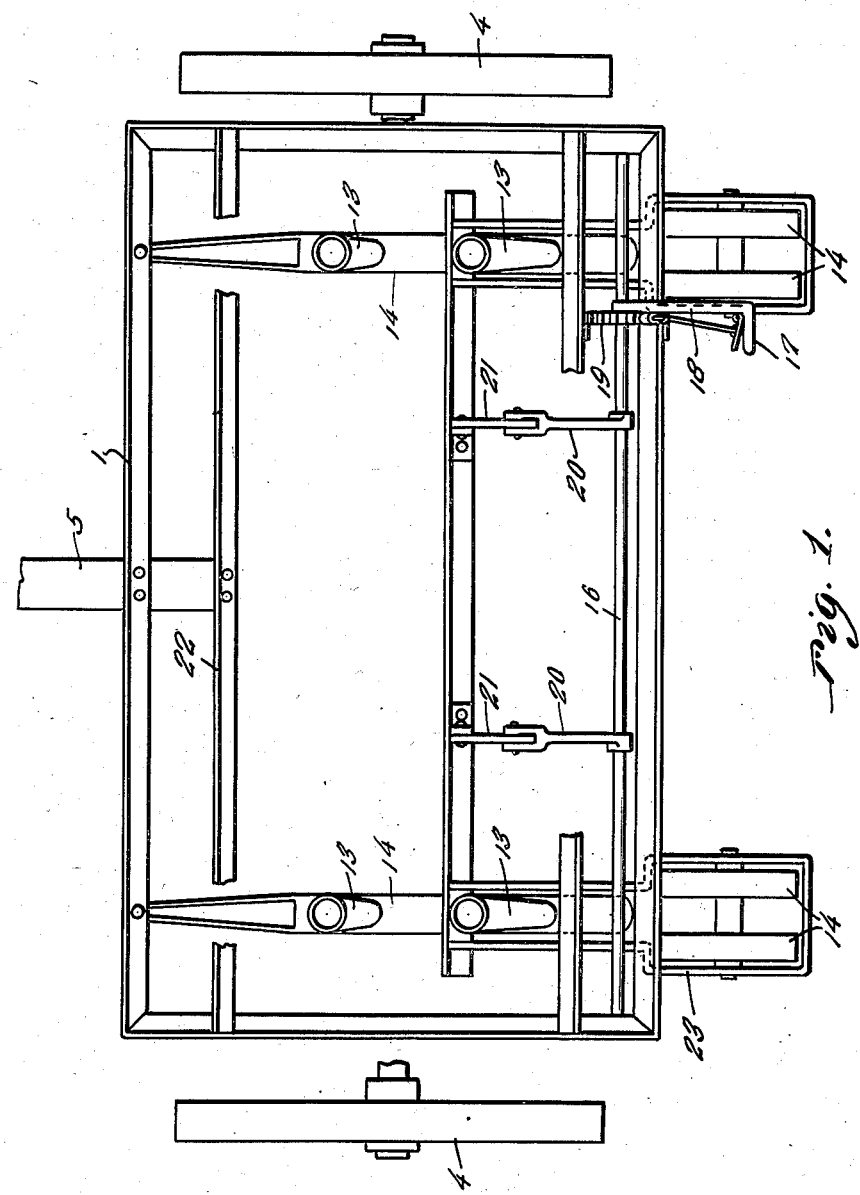

2,048,441

UNITED STATES PATENT OFFICE 2,048,441

PLANTER

David Edward Feltman, Ottawa, Ohio

Original application May 14, 1935, Serial No. 21,445. Divided and this application September 4, 1935, Serial No. 39,165

1 Claim. (Cl. 111—59)

This invention relates to new and useful improvements in planters and more particularly to a machine of this character which is adapted to deposit both seed and fertilizer.

The present invention consists in the provision of improved planter elements particularly adapted for machines of this character.

The present application is directed to subject matter divided out of a co-pending application filed by me under date of May 14, 1935, Serial No. 21,445 and entitled "Planter".

The invention together with its objects and advantages will be best understood from a study of the following description taken in connection with the accompanying drawings wherein:

Figure 1 is a top plan view of the improved dispensing mechanism, with the hopper and certain other parts removed.

Figure 2 is a view partially in elevation and partially in section illustrating the application of the invention and—

Figure 3 is a fragmentary detail elevational view illustrating certain details hereinafter more fully referred to.

Referring to the drawings more in detail it will be seen that 1 indicates a frame from the sides of which depend plates 2 that support an axle 3 on which are journalled the tread wheels 4. A suitable tongue 5 is secured to the frame 1.

Suitably mounted on the frame is a hopper 6 divided by a vertical partition 7 into fertilizer and feed compartments 10 and 11 respectively.

The compartments 10 and 11 are provided in their bottoms with discharge openings 12 with which flexible depositing tubes 13 communicate.

The device as above described is more fully and completely set out in the parent application hereinbefore referred to, and not being of the essence of the present invention further detail disclosure thereof is deemed unnecessary.

In accordance with the present invention improved means is provided for elevating or lowering the tubes 13 with respect to the ground. To this end then it will be seen that in the preferred embodiment thereof the invention consists in the provision of compound shoes 14 which are connected, at their forward ends for swinging movement in a vertical plane on the frame 1 as at 16. The shoes 14 are constructed to cover the fertilizer as said fertilizer is deposited, thus causing the seed to be deposited on the dirt with which the fertilizer has been covered.

A shaft 16 is journalled in suitable bearings provided therefor beneath the rear portion of the frame 1 and fixed on said shaft is a hand lever 17 which is provided with a suitable detent structure 18 engageable with a notched quadrant 19 for releasably securing the lever in adjusted position.

A pair of arms 20 are also fixed on the shaft 16 and are adjustably connected with links 21. The links 21 serve to pivotally connect the arms 20 to a bar 22 which extend between the shoes 14 and is suitably secured to the shoes.

As clearly shown in Figure 2 the lower end of the flexible tubes 13 are anchored in openings which are provided therefor in the shoes 14.

From the above it will be apparent that by manipulating the lever 16 shoes 14 may be raised or lowered with respect to the ground to the end that the fertilizer and seed may be deposited at any desired depth.

Frames 23 are pivotally connected to the bar 22 and extend rearwardly thereof. Packer wheels 24 are journalled in the frames behind the shoes 14 as shown.

From the foregoing it will be seen that the fertilizer and seed fall by gravity through the flexible tubes 13 into the furrow the fertilizer being deposited first after which the seed is subsequently deposited. By reason of their construction the shoes 14 will cover the seed which is deposited and the packing wheels 24 will complete the operation. Through the medium of the lever 17 the depth at which the machine operates in the ground may be controlled as desired.

Having thus described my invention, what I claim as new is:

A planter of the character described comprising a wheel-supported frame, a hopper mounted on the frame and provided with a vertical partition dividing the hopper into a fertilizer compartment and a seed compartment respectively, a pair of laterally spaced shoes pivotally connected at their forward ends to the frame, said shoes having spaced openings therethrough, flexible feed tubes connected at one end with the fertilizer compartment and having free ends extending through certain of the openings in said shoes, other flexible feed tubes connected at one end with the seed compartment and having free ends extending through the remaining openings in said shoes, a transverse bar connecting said shoes adjacent the free ends of the latter, a transverse shaft journaled in said frame, arms on said shaft, adjustable link connections between said arms and said transverse bar for transmitting movement of the shaft to the shoes for raising and lowering the latter, an operating handle connected with said shaft, a quadrant mounted on said frame and said handle having a detent assembly cooperable with the quadrant for securing the shoes at the desired vertical adjustment, frames pivotally connected at one end with said transverse bar, there being a frame for each shoe, and a pair of laterally spaced wheels journaled in the free end of each frame the wheels of each pair being disposed laterally of a shoe.

DAVID EDWARD FELTMAN.